March 5, 1946.　　　M. H. SCHRENK ET AL　　　2,395,912
VOLTAGE COMPARISON APPARATUS
Filed July 14, 1941
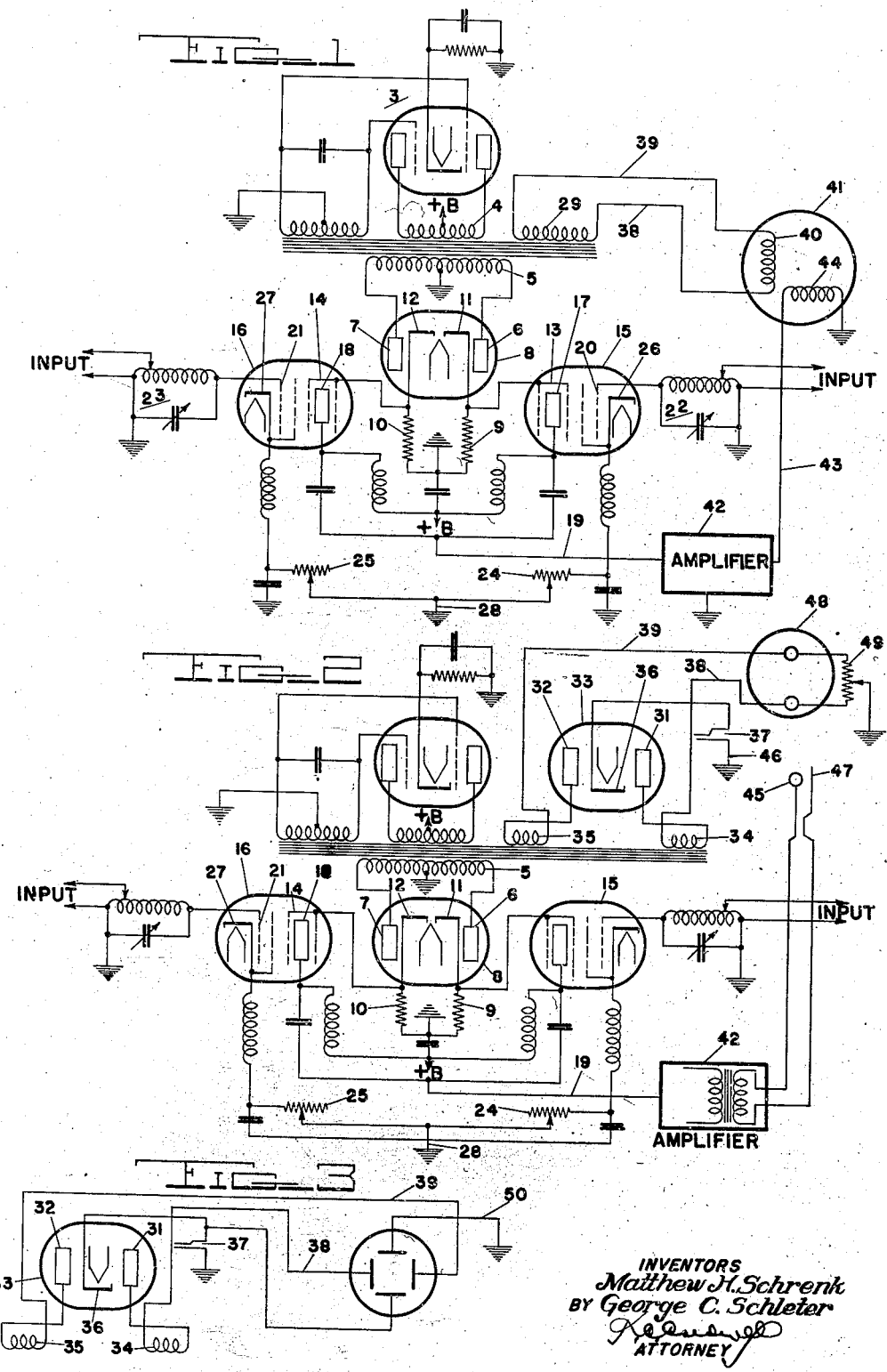
INVENTORS
Matthew H. Schrenk
BY George C. Schleter
ATTORNEY Patented Mar. 5, 1946

2,395,912

UNITED STATES PATENT OFFICE 2,395,912

VOLTAGE COMPARISON APPARATUS

Matthew H. Schrenk and George C. Schleter, Washington, D. C.

Application July 14, 1941, Serial No. 402,426
8 Claims. (Cl. 175—183)

(Granted under the act of March 3, 1883, as amended April 30, 1928; 370 O. G. 757)

This application is a continuation in part of our application Serial No. 238,112 for Voltage comparison apparatus, filed October 31, 1938.

This invention relates to means for comparing two voltages, either as to amplitude or as to wave form.

Among the several objects of this invention are:

To provide apparatus for accurately showing on a single indicating device the relative amplitudes, or the wave forms, of two voltages to be compared.

To provide apparatus to control output currents to be utilized for comparison by the joint action of the voltages to be compared and potentials synchronized with other potentials;

To provide apparatus of the type mentioned that is adapted to use with either an alternating current or a direct current indicator.

Other objects will be apparent to those skilled in this art from the following description when read in connection with the accompanying drawing wherein:

Fig. 1 shows schematically a form of our invention particularly adapted for use with an alternating current indicator;

Fig. 2 depicts our invention modified for use with a direct current indicator.

It is frequently desired to compare the amplitudes of two voltages either from the same source when received through different collecting and amplifying means or when one is derived from a standard of known amplitude and the other is from a source to be compared or calibrated. Likewise, the wave forms of two voltages must frequently be compared to determine features or similarity or difference. The present invention provides means for such comparisons.

In Fig. 1 the push-pull audio oscillator, designated as a whole by the reference 3, includes an inductance 4 in its output circuit to which is coupled a second inductance 5, whereof the terminals are respectively connected to anodes 6 and 7 of rectifier 8. The resistances 9 and 10 are respectively in series with cathodes 11 and 12 of the rectifier 8. Screen grids 13 and 14 of pentode vacuum tubes 15 and 16 are respectively connected to the high potential sides of resistances 9 and 10 and anodes 17 and 18 of the pentode tubes have a common output 19.

Control grids 20 and 21 of tubes 15 and 16 are connected to tuned input circuits 22 and 23 whereby the voltages to be compared are applied to the respective tubes. It is to be understood that tubes 15 and 16 need not necessarily be pentodes and that while inputs 22 and 23 are preferably tuned for comparing radio frequency voltages, they may be untuned. Sensitivity control resistances 24 and 25 are respectively connected to cathodes 26 and 27 of tubes 15 and 16 and have a common connection to grounded at 28.

The inductance 29 is also coupled to inductance 4 of oscillator 3 and has its terminals connected by leads 38 and 39 either to one of the coils 40 of an alternating current indicator 41 of the electrodynamometer type having an index that can swing to either side of a median zero point for comparing amplitudes of voltages, or they may be connected to the deflection plates of a cathode ray tube for comparing either the amplitudes or the wave forms of the voltages impressed upon tubes 15 and 16 through inputs 22 and 23. Output 19 may be connected to the input of suitable amplifying means 42, when the voltages to be compared are small, the output 43 of such amplifying means being connected to the other coil 44 of the indicator or if the voltages to be compared are of sufficient strength, output 19 may be directly connected to coil 44.

It will, of course, be understood that any source of alternating current of suitable frequency may be substituted for the oscillator 3, and that the frequency of such current should be high enough that so long as the inputs to an indicator of the electrodynamometer type are equal on both half waves the index of the indicator will not follow the alterations of the current but will remain at zero.

The operation of this form of our invention is as follows:

The potentials developed across resistances 9 and 10 are alternately applied to screen grids 13 and 14 to swing these grids positive, and each of these potentials is synchronized with the application of potential in a definite direction to the indicator connected to inductance 29, and thus the index of such indicator will tend always to swing in the same direction each time a positive potential is applied to one of the screen grids and in the opposite direction each time a positive potential is applied to the other screen grid. However, in the absence of input voltage to grids 20 and 21 no current passes through the tubes 15 and 16, but when the voltages to be compared are applied to grids 20 and 21 the output of each tube will be added to the output from inductance 29 and so long as the amplitudes of voltages applied to grids 20 and 21 are equal the indicator will still read zero. When the voltage applied to, say, grid 20 is greater than that applied to grid 21 the input to the indicator will be greater during that half wave that tube 15 is passing current, and hence the index of the indicator will be moved in the direction it is urged during the passage of current through tube 15. When the voltages are to be compared as to wave form the pattern on the cathode ray tube screen will show on one side the form of the voltage applied to grid 20 and on the other the form of the voltage applied to grid 21, and since the alternations applied through inductance 29 are preferably of a frequency sufficiently great to produce persistence of vision there will appear standing patterns of the two wave forms.

The apparatus depicted in Fig. 2 is identical in all respects with that in Fig. 1 except that in place of the inductance 29 the anodes 31 and 32 of a full wave rectifier 33 are respectively coupled to inductance 4 by inductances 34 and 35 and output terminals 45, 47 of amplifier 42 are connected to cathode 36 of rectifier 33 through jack 37 which is grounded at 46. The output leads 38, 39 of rectifier 33 may be connected to D. C. indicator 48 which is provided with a grounded potentiometer type resistance 49. It is apparent that the outputs from the anodes 31 and 32 will be synchronized with the passing of current through tubes 15 and 16.

In Fig. 3 is shown the manner in which the circuit of Fig. 2 may be connected to the deflection plates of a cathode-ray oscillograph. The output leads 38, 39 of rectifier 33 are connected to one pair of plates, while of the other pair one is grounded at 50 and the other is connected to the cathode 36 of rectifier 33. The output terminals 45 and 47 are connected to jack 37 as before.

The cathode-ray oscillograph may be used in connection with the circuit of Fig. 1 in the same manner. The leads 38 and 39 will be connected to one pair of deflection plates as shown in Fig. 3 while the lead 43 will connect to one plate of the other pair, the remaining plate being grounded.

It should be understood that the practice of the invention is not limited to the embodiments illustrated and described but is circumscribed only by the scope and limitations of the appended claims.

The invention described herein and claimed may be used and/or manufactured by or for the Government of the United States of America for governmental purposes without the payment of any royalties thereon or therefor.

We claim:

1. Voltage comparison apparatus, comprising a push-pull oscillator having an output circuit including an inductance, a rectifier having two anodes respectively connected to opposite ends of said inductance and two cathodes respectively cooperating with said anodes, a resistance in series with each said cathode, a common ground connection for said resistances; two vacuum tubes each having a screen grid respectively connected to the high potential side of one of said resistances, an anode, a cathode and a control grid; a tuned input circuit for a voltage to be compared connected to each said control grid, a common output circuit connected to the anodes of said vacuum tubes, a sensitivity control resistance connected to each said cathode, a common ground connection for said sensitivity control resistances, and an inductance coupled to the output of said oscillator to supply two voltages of opposite sense each of which is respectively synchronized with the output of one of said vacuum tubes.

2. Voltage comparison apparatus, comprising a push-pull oscillator whereof the output is alternately in opposite senses, means to derive from each sense a separate positive potential; two vacuum tubes each having a screen grid connected to have a respective said positive potential applied to it, a cathode, a control grid, and an anode; an input circuit for a voltage to be compared connected to each of said control grids, a common output circuit connected to the anodes of said tubes, and means to derive from said oscillator opposite potentials each of which is respectively synchronized with the positive potential applied to one of said screen grids.

3. Voltage comparison apparatus, comprising a push-pull oscillator whereof the output is alternately in opposite senses, means to derive from each sense a separate positive potential; two vacuum tubes each having an electrode connected to have a respective said positive potential applied to it, a control grid and an output electrode; an input circuit for a voltage to be compared connected to each of said control grids, a common output circuit for said output electrodes, and means to derive from said oscillator opposite potentials each of which is respectively synchronized with the said positive potential applied to one of said tubes.

4. Voltage comparison apparatus, comprising a source of low frequency alternating current, means for deriving a potential from each half wave of said current; two vacuum tubes each connected to be controlled by the joint and simultaneous action of a respective one of said potentials and a separate voltage to be compared, a common output circuit for said tubes, and means to derive from said source opposite potentials each of which is respectively synchronized with the passing of current by one of said tubes.

5. Voltage comparison apparatus, comprising two vacuum tubes, means to apply to each of said tubes a separate voltage to be compared, a second means to apply to each of said tubes alternately a potential to cooperate with the respective one of said voltages to cause the tubes to pass current, a common output circuit for said tubes, means to derive from said second means potentials each of which is respectively synchronized with the application to each tube of a first mentioned potential, and means to combine the output of each tube with the respective potential from said second means.

6. Voltage comparison apparatus, comprising a push-pull audio oscillator having an output circut including an inductance, a rectifier having two anodes respectively connected to opposite ends of said inductance and two cathodes respectively cooperating with said anodes, a resistance in series with each said cathode, a common ground connection for said resistances; two vacuum tubes each having a screen grid respectively connected to the high potential side of one of said resistances, an anode, a cathode and a control grid; a tuned input circuit for a voltage to be compared connected to each said control grid, a common output circuit connected to the anodes of said vacuum tubes, a sensitivity control resistance connected to each said cathode, a common ground connection for said sensitivity control resistances, and a full wave rectifier coupled to the output circuit of said oscillator, the output of said rectifier on each half wave being respectively synchronized with the output of one of said tubes to be combinable with the output of the respective said tube to actuate an indicator.

7. Voltage comparison apparatus, comprising a source of low frequency alternating current, means for deriving a potential from each half wave of said current; two vacuum tubes each connected to be controlled by the joint and simultaneous action of a respective one of said potentials and a separate voltage to be compared, a common output circuit for said tubes, and a full wave rectifier coupled to said source, the output of said rectifier on each half wave being respectively synchronized with the output of one of said tubes to be combinable with the output of the respective said tube to actuate an indicator.

8. Voltage comparison apparatus, comprising means providing two separate electron streams, means for applying each of the voltages to be compared to control in part the flow of a respective one of said streams, means separately providing potentials to cooperate with each of said voltages to cause the respective electron stream to flow, means providing a potential individually synchronized with the flow of each electron stream, and means for combining each output resulting from the said electron stream flow with the said last mentioned potential synchronized therewith.

MATTHEW H. SCHRENK.
GEORGE C. SCHLETER.